US005194785A

United States Patent [19]

Grubben et al.

[11] Patent Number: 5,194,785

[45] Date of Patent: Mar. 16, 1993

[54] CATHODE RAY TUBE AND DEFLECTION UNIT SUITABLE FOR USE IN SUCH A CATHODE RAY TUBE

[75] Inventors: Antonius P. M. Grubben; Johannus T. F. van Kemenade; Jacobus J. M. van de Meerakker, all of Eindhoven, Netherlands

[73] Assignee: U.S. Philips Corporation, New York, N.Y.

[21] Appl. No.: 801,245

[22] Filed: Dec. 3, 1991

[30] Foreign Application Priority Data

Dec. 10, 1990 [NL] Netherlands ........................ 9002702

[51] Int. Cl.[5] ........................... G01S 1/44; H01F 7/00

[52] U.S. Cl. ..................................... 315/399; 335/210

[58] Field of Search ................ 315/399; 335/210, 212, 335/213; 336/192, 195, 198

[56] References Cited

U.S. PATENT DOCUMENTS 2,980,815 4/1961 Ecker ................................ 335/210

3,629,750 12/1971 Nienaber ............................ 335/210

*Primary Examiner*—Gregory C. Issing

*Attorney, Agent, or Firm*—R. J. Kraus

[57] ABSTRACT

An electromagnetic deflection unit (7) coaxially surrounds a part of the envelope (1) of a cathode array tube. The deflection unit (7) comprises a coil support (8) and a deflection coil system (11, 11') which is located between the coil support (8) and the envelope (1). Each end portion (18, 18') of the coils (11, 11') is located exclusively on the side of the front flange (16, 16') of the associated coil (11, 11') facing away from the envelope (1). By virtue thereof, the deflection unit (7) can be tilted relative to the envelope (1) such that a sufficient degree of convergence of electron beams on the display screen of the cathode ray tube is obtained.

8 Claims, 4 Drawing Sheets

CATHODE RAY TUBE AND DEFLECTION UNIT SUITABLE FOR USE IN SUCH A CATHODE RAY TUBE

BACKGROUND OF THE INVENTION

The invention relates to a cathode ray tube having an envelope and an electromagnetic deflection unit which coaxially surrounds a part of the envelope and which comprises a flared coil support. A deflection coil system is positioned between the coil support and the envelope, and comprises a pair of diametrically opposite coils, each of which fans out, and packs of conductors which surround a window and which form a front flange at the wide end portion and a rear flange at the narrow end portion.

The invention further relates to a deflection unit which is suitable for use in such a cathode ray tube.

Such a cathode ray tube can be used in colour television, data-display devices and in other devices in which a cathode ray tube is used.

In the energized state, the deflection unit deflects electron beams generated in the envelope in mutually orthogonal directions to form an image to be displayed. Preferably, the deflection coil system is located as close to the envelope as possible to minimize the energy necessary for deflecting the electron beams. Such energy is proportional to the magnitude of the electric current which is necessary during energizing the deflection unit to bring about sufficient deflection, and is governed by the distance between deflection coil system and electron beams.

In practice, however, it may occur that despite the carefully determined position of the packs of conductors of the deflection coil system, the convergence of electron beams generated in the neck portion is not always sufficient during deflection.

SUMMARY OF THE INVENTION

It is an object of the invention to provide, inter alia, a cathode ray tube having a deflection unit, in which the above-mentioned occurrence of insuficient convergence is at least partially precluded.

According to the invention, this object is achieved in a cathode ray tube of the type described in the opening paragraph, in that each coil's conductor adjoining the window has an end portion which is connected to a connection pin which is to be connected to a voltage source, which connection pin is secured to the coil support on the side of the coil support facing away from the envelope, and in that the deflection unit comprises means for locating the end portion of each coil in the vicinity of the front flange, exclusively on the side of the front flange facing away from the envelope.

The invention is based on the insight that to attain a sufficient degree of convergence of the electron beams generated in the envelope, the deflection unit must be positioned in a specific way relative to the envelope. Said specific position is generally adjusted for each combination of deflection unit and cathode ray tube separately. During adjusting, a deflection unit is located on the envelope and a test pattern is displayed while energizing the deflection unit. The position of the deflection unit relative to the envelope is then varied until a desired test pattern having sufficient convergence is displayed. Said variation of the position generally involves a tilting of the axis of the deflection unit relative to the axis of the cathode ray tube. Due to said tilting, the positioning of the deflection unit relative to the cathode ray tube to attain a sufficient degree of convergence is also termed "tilting".

When the deflection unit is tilted sufficiently i.e. is positioned relative to the envelope such that the convergence is sufficient, the deflection unit is fixed to the envelope in said position.

In order to enable a sufficient degree of tilting of the deflection unit, there has to be a clearance between the deflection unit and the envelope. On the other hand, however, the deflection unit should be located as close to the envelope as possible to minimize the energy required for deflecting the electron beams.

The invention is further based on the insight that, despite carefully taken measures, the occurrence of insufficient convergence in the known cathode ray tubes can be largely attributed to a limitation of the tiltability of the deflection unit caused by the location of the end portions (the lead out wire). The end portion of each coil is located between the front flange of the relevant coil and the envelope and extends over the conductors of the front flange towards the wide end portion of the coil. Since said end portion undesirably takes up space, the clearance between the envelope and the deflection unit is limited and, hence, also the tiltability. Due to this, it may occur that, with a view to a sufficient degree of convergence, the deflection unit does not take up the desired position relative to the envelope.

This problem occurs in particular when the lead-out wire has too large a thickness, for example, when said lead-out consists of a plurality of adjoining wires.

The problem of insufficient convergence occurs in particular with a deflection unit having a deflection coil system with coils the rear flange of which extends substantially parallel to the outside surface of the adjoining part of the envelope. Such coils are termed saddle coils with a lying rear flange.

By providing the deflection unit, in accordance with the invention, with means for positioning the end portion of each coil exclusively on the side of the front flange facing away from the envelope, and not between the front flange and the envelope, it becomes possible to at least partly remove the limitation of the tiltability of the deflection unit. Since the end portion is now positioned between the front flange and the coil support, it is precluded that on tilting the deflection unit relative to the envelope the end portion will undesirably bear against the envelope and, thus, limit the tiltability. However, the end portion cannot be randomly positioned between the front flange and the coil support. The deflection unit has to be provided with means ensuring that the location of the end portion does not change the clearance between the coil and the coil support in comparison with an imaginary situation in which there are no end portions. A change of the clearance could limit the tiltability of the deflection unit relative to the envelope.

An embodiment of a cathode ray tube according to the invention is characterized in that the means are apertures which are formed in the coil support and which extend straight through the coil support, a part of an end portion being located in the associated aperture. By means of an aperture straight through the coil support, it can be realised in a simple manner that the end portion extends towards the side of the coil support facing away from the envelope without limiting the tiltability of the deflection unit relative to the envelope.

Preferably, a cathode ray tube according to the invention is characterized in that the means are slots which are formed in the inside of the coil support and which extend towards the wide end portion of the coil support, a part of an end portion being located at the bottom of the associated slot. In particular in the case of a deflection unit having a further deflection coil system secured to the side of the coil support facing away from the envelope by means of a curing synthetic resin, preferably, this method of securing is taken into account when the end portion of each coil is positioned. If in this type of deflection unit an aperture is formed straight through the coil support to interconnect the end portion and the connection pin, during securing the coils, a quantity of synthetic resin may land on the inside of the coil support via the aperture. The synthetic resin between the coil support and the envelope may adversely affect the tiltability of the deflection unit relative to the envelope. To preclude this, the deflection unit must be subjected to an additional process step before it is provided on the envelope, which process step consists in removing the synthetic resin from the inside of the coil support.

If, in accordance with the invention, the end portion is positioned at the bottom of an associated slot extending towards the wide end portion of the coil support, said additional process step for removing synthetic resin is not necessary.

Preferably, the depth of each slot is at least equal to the thickness of the associated end portion. By virtue thereof, neither the position of the coil relative to the coil support, nor the tiltability of the deflection unit relative to the envelope are negatively influenced.

An alternative embodiment of a cathode ray tube according to the invention is characterized in that the means are cuts which are made in the coil support and which extend towards the wide end portion of the coil support, a part of an end portion being positioned in the associated cut. In practice it has been found that when the coil support is provided with cuts, the end portion and the connection pin can be interconnected in a very simple manner.

An additional advantage of the cathode ray tube according to the invention consists in that the end portion can be electrically insulated from the front flange in a very simple manner.

To obtain a sufficiently correct deflection field, the conductors in the vicinity of the wide end portion of the front flange are at another electric potential that the conductors of the front flange in the vicinity of the window. In the known cathode ray tubes, the end portion extends over the front flange. Although the conductors of the front flange as well as the end portion are provided with an insulating layer, the difference in potential between the end portion and the wide end portion of the front flange for a certain required deflection field may become so great that breakdown undesirably occurs. In the known cathode ray tubes, this is precluded by providing electrically insulating material between the end portion and the front flange. As a result thereof, however, the tiltability is limited even further.

When, in accordance with the invention, the end portion is connected to the connection pin via an aperture in the coil support, the distance between the end portion and the wide end portion is generally large enough to preclude breakdown. Besides, the material of the coil support is electrically insulating. Thus, no additional measures are required to obtain electrical insulation.

When, in accordance with the invention, the depth of the slot is larger than the thickness of the end portion and the end portion is located at the bottom of the slot, breakdown can be precluded by a proper selection of the depth. It is alternatively possible to fill the slot with electrically insulating material.

A further embodiment of a cathode ray tube according to the invention is characterized in that the coil support is provided on the inside with a fixation means for fixing the end portions. Thus, it can be realised in a simple manner that the end portion is situated inside the deflection unit at a location determined by the fixation means, at which location the end portion cannot influence the tiltability of the deflection unit.

Preferably, the fixation means is a hook which is integrated into the coil support, so that no separate component need be used for the fixation means.

The invention further relates to a deflection unit which is suitable for use in a cathode ray tube according to the invention, which deflection unit is characterized in that it comprises means for locating the end portion of each coil exclusively on the side of the front flange of the relevant coil facing the coil support. By virtue thereof, the deflection unit can be tilted in such a manner relative to an envelope on which said deflection unit is located, that a sufficient degree of convergence is attained.

BRIEF DESCRIPTION OF THE DRAWING

The invention will be explained in greater detail by means of the accompanying drawing figures, in which.

DESCRIPTION OF THE PREFERRED EMBODIMENTS

Figure 1:
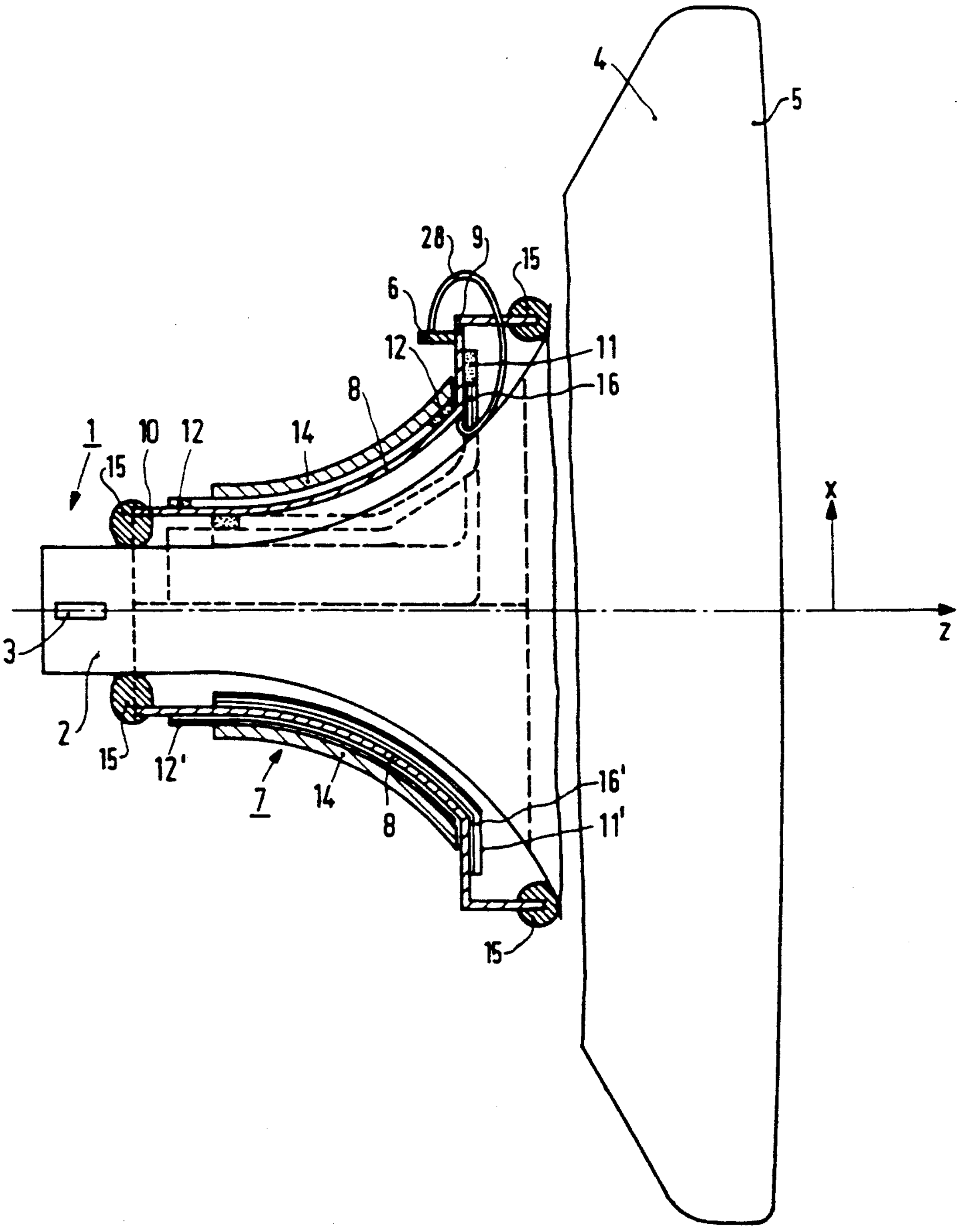
FIG. 1 PRIOR ART
FIG. 1 is a diagrammatic partial cross-sectional view of a known cathode ray tube on which a deflection unit is located.

FIG. 1 is a cross-sectional view of a known cathode ray tube having an envelope 1 comprising a narrow neck portion 2 in which an electron gun system 3 is mounted, a wide cup-shaped portion 4 and a display window 5. A deflection unit 7 is mounted on the envelope 1 at the location of the transition from the narrow to the wide portion. The deflection unit 7 comprises a flared coil support 8 of insulating material having a front end portion 9 and a rear end portion 10. A first deflection coil system 11, 11' is positioned between the coil support 8 and the envelope, said deflection coil system generating, in the energized state, a deflection field for deflecting electron beams produced by the iz electron gun system 3 in the X-direction. In this case, a second deflection coil system 12, 12' for generating a deflection field by which electron beams produced by the electron gun system 3 are deflected in the vertical direction (perpendicularly to the plane of the drawing) is provided on the outside of the coil support 8. Both the first deflection coil system 11, 11' and the second deflection coil system 12, 12' are provided with a pair of diametrically opposite coils each of which fans out. Each coil has a front flange and a rear flange. In this case, the individual coils 12, 12' of the second deflection coil system and the coils 11, 11' of the first deflection coil system are of a type such that the rear flange extends substantially parallel to the outside surface of the adjoining part of the envelope 1. This type of coils is termed saddle coils with a lying rear flange.

The invention is not limited to this type of deflection coils and also relates to a deflection unit in which each coil is of a type such that the rear flange extends transversely to the outside surface of the adjoining part of the envelope. This type of coil is termed "saddle coil".

The invention further relates to a deflection unit in which, for example, the coils of the first deflection coil system 11, 11' are of the saddle type with lying rear flange and the coils of the second deflection coil system 12, 12' are of the ordinary saddle type with upstanding rear flange.

The coils of the second deflection coil system may, for example, alternatively be toroidally wound on a ring core 14 of magnetizable material. Moreover, both deflection coil systems can be positioned between the coil support 8 and the envelope 1.

During displaying an image, the convergence of electron beams on a display screen provided on the inside of the display window 5 has to be sufficient. In order to realize a sufficient degree of convergence, deflection unit 7 is fixed in an aligned position on the envelope of the cathode ray tube.

The aligned position is determined by displaying a test pattern and tilting the deflection unit 7 relative to the envelope 1 until a desired test pattern is produced. When the deflection unit 7 is in the desired position, it is secured to the envelope 1 by means of fixation means 15.

In order to allow a sufficient degree of tilting of the deflection unit 7, there must be a clearance between the deflection unit 7 and the envelope 1.

In practice, however, it may occur that the convergence of the known cathode ray tubes is insufficient, because the desired degree of tilting cannot be realized due to the fact that in the known cathode ray tubes an end portion of each coil of the first deflection coil system 11, 11' is positioned such that the tiltability of the deflection unit 7 relative to the envelope is limited. The end portions in question serve to apply the necessary voltage to the coil. For this purpose, the end portions are connected to connection pins (one of which, referenced 6, is shown in FIG. 1) which are secured to the coil support 8 on the side of the coil support facing away from the envelope. The limitation of the tiltability is obtained in that the end portion (one of which, referenced 28, is shown in FIG. 1) of each coil 11, 11' is positioned between the front flange 16, 16' of the relevant coil and the envelope 1 and extends over the conductors of the front flange 16, 16' towards the wide end portion of the coil 11, 11'.

Figure 2:
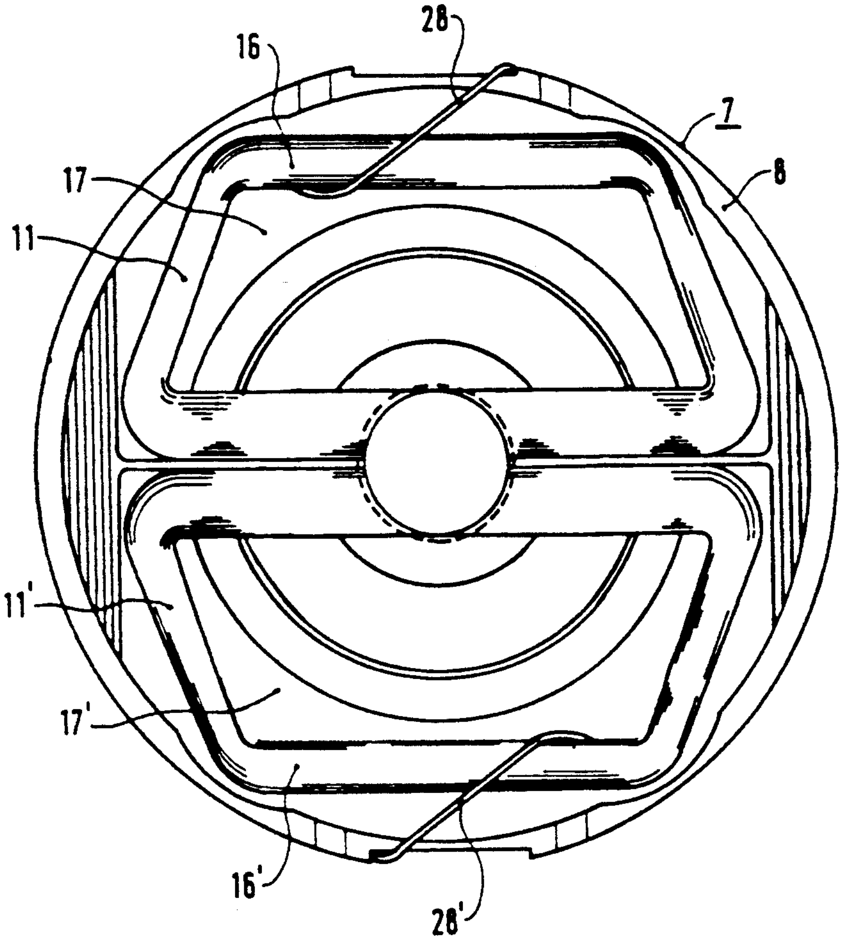
FIG. 2 PRIOR ART
FIG. 2 depicts a known deflection unit viewed from the wide end portion of the coil support.

FIG. 2 shows a known deflection unit 7, viewed from the wide end portion of the coil support 8, and clearly depicts the location of the end portions.

The coils 11, 11' of the first deflection coil system fan out towards the display window. Each of the coils 11, 11' is built up of packs of conductors surrounding a window 17, 17'. At the wide end portion, the packs of conductors form the front flanges 16, 16'. To generate the necessary deflection field, the potential of the conductors of each front flange 16, 16' must increase in the direction of the display window. To this end, the conductor of each coil 11, 11', which conductor adjoins the display window 17, 17', has an end portion 28, 28' which is connected to a connection pin (not shown in FIG. 2) which is secured to the coil support 8 on the side of the coil support 8 facing away from the first deflection coil system. The connection pins can be connected to a voltage source.

Further, the conductor of each coil 11, 11' has at the wide end portion of the coil 11, 11' a further end portion which can be connected to a voltage source through a connection pin. The further end portion is not shown in the Figures because it is not directly related to the invention.

When the deflection unit 7 is positioned on the envelope, the end portions 28, 28' are located between the front flanges 16, 16' and the envelope. Owing to this location of the end portions 28, 28', the tiltability of the deflection unit 7 relative to the envelope is limited and, hence, also the possibility of sufficiently correctly adjusting the convergence.

The tiltability is limited, in particular, when the part of the end portion which extends over the conductors of the front flange is electrically insulated therefrom, for example, by means of an insulating tape. Due to this, the end portion together with the tape undesirably take up even more space between the front flange and the envelope. Besides, the limitation of the tiltability occurs, in particular, when the front flange extends at least partly parallel to the outside surface of the associated portion of the envelope.

According to the invention, this limitation of the tiltability is precluded by providing the deflection unit with means for locating the end portion of each coil of the first deflection coil system in the vicinity of the front flange, exclusively on the side of the front flange facing away from the envelope.

Figure 3:
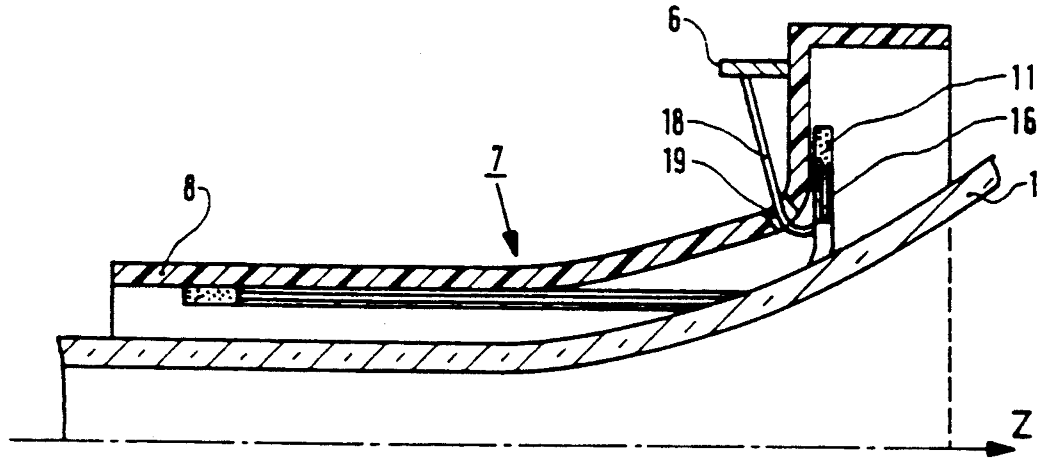
FIG. 3 is a cross-sectional view of an embodiment of a deflection unit according to the invention.

FIG. 3 diagrammatically shows a cross-sectional view of a part of a deflection unit and a cathode ray tube according to an embodiment of the invention. For the sake of convenience, only one of the coils 11 of the first deflection coil system is shown and the second deflection coil system is left out. In the present embodiment, the means for positioning the end portion 18 of the coil 11 exclusively on the side of the front flange 16 facing away from the envelope 1 are formed by an aperture 19 which extends straight through the coil support 8. The end portion 18 extends through the aperture 19 towards the side of the coil support 8 facing away from the envelope and is connected to the connection pin 6. To adjust the convergence, the deflection unit 7 can be maximally tilted relative to the envelope 1, i.e. until the front flange 16 bears against the outside wall of the envelope 1. However, if the end portion is positioned between the front flange and the envelope, the deflection unit can only be tilted until the end portion comes to bear against the envelope.

Figure 4:
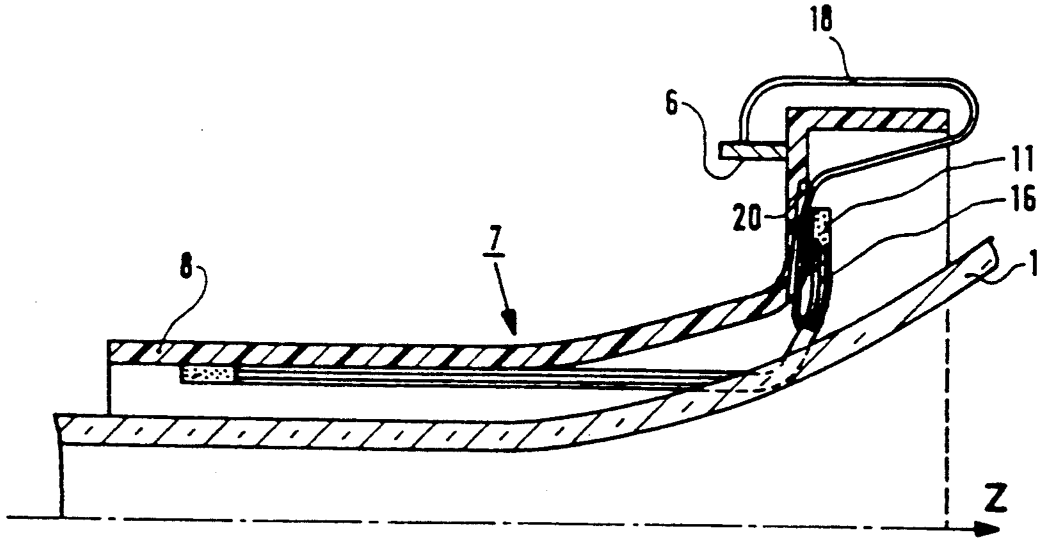
FIG. 4 is a cross-sectional view of an alternative embodiment of a deflection unit according to the invention.

FIG. 4 diagrammatically shows a cross-section of a part of a deflection unit and a cathode ray tube according to an alternative embodiment of the invention. The means for locating the end portion 18 of the coil 11 exclusively on the side of the front flange 16 facing away from the envelope 1 are formed in this embodiment by a slot 20 which is provided in the inside of the coil support 8. In this case, the front flange 16 extends, at least partly, parallel to the outside surface of the envelope. The slot 20 extends towards the wide end portion of the coil support 8 and a part of the end portion 18 is located at the bottom of the slot 20. In this embodiment, the deflection unit 7 can be maximally tilted relative to the envelope 1. Preferably, the depth of the slot 20 is at least equal to the thickness of the end portion 18. In this manner, it is prevented that the front flange 16 is undesirably urged to the envelope 1 by the end portion 18.

If it is necessary for the electrical insulation of the front flange and the end portion, the slot can be constructed so that it is deeper and, if required, it can be filled with electrically insulating material.

Figure 5:
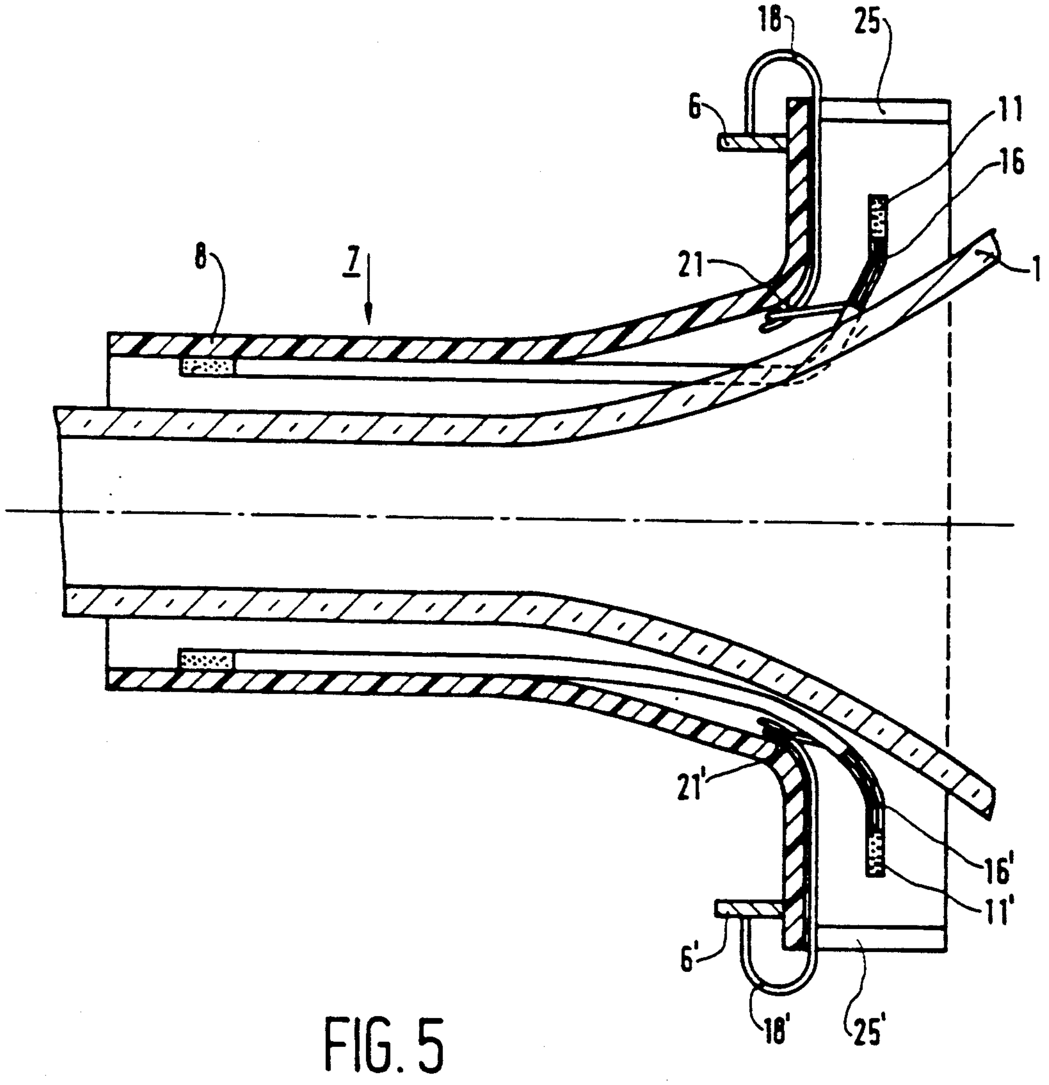
FIG. 5 is a diagrammatic cross-sectional view of a further embodiment of a deflection unit according to the invention, which deflection unit is tilted relative to the envelope.

FIG. 5 diagrammatically shows a cross-sectional view of a deflection unit 7 which is tilted relative to the envelope of a cathode ray tube. The deflection unit 7 is tilted such that the electron beams generated in the cathode ray tube exhibit a sufficient degree of convergence on the display screen. The end portions 18, 18' of the coils 11, 11' are connected to connection pins 6, 6' via cuts 25, 25' extending to the wide end portion of the coil support 8. To preclude that the end portions are randomly situated between the coil support 8 and the envelope 1, the coil support 8 is provided on the inside with fixation means for fixing the end portions 18, 18'. Preferably, said fixation means are hooks 21, 21' which are integrated into the coil support 8 and around which the end portions are wound. In addition, it is alternatively possible to, for example, fix the end portions on the inside of the coil support by means of an adhesive.

We claim:

1. A cathode ray tube apparatus including an envelope containing a luminescent screen and an electron gun for producing a plurality of electron beams directed toward the screen, and a deflection unit mounted exteriorly of a flared portion of the envelope for deflecting the beams across the screen in convergence, said deflection unit comprising a flared coil support having an inner surface and an outer surface, a first deflection coil system disposed adjacent the outer surface of the coil support, and a second deflection coil system disposed substantially between the inner surface of the coil support and the envelope, said second deflection coil system comprising first and second coils disposed on opposite sides of an axis of the tube, each of said coils including a front flange-shaped portion extending away from the axis and being formed by a packet of conductors running transversely of the axis at a wider end of the flared coil support, at least one of said coils having an end conductor comprising one of said conductors which is disposed away from an outer periphery of the respective flange, characterized in that:

a. the deflection unit includes electrical connection means disposed at the outer surface of the coil support; and b. the coil support includes conductor-receiving means for routing said at least one coil end conductor to said electrical connection means without said conductor occupying substantial space between the inner surface of said coil support and the flange-shaped portion of the respective coil.

2. A deflection unit apparatus for a cathode ray tube including an envelope containing a luminescent screen and an electron gun for producing a plurality of electron beams directed toward the screen, said deflection unit being adapted for mounting exteriorly of a flared portion of the envelope to effect deflection the beams across the screen in convergence and comprising a flared coil support having an inner surface and an outer surface, a first deflection coil system disposed adjacent the outer surface of the coil support, and a second deflection coil system disposed adjacent the inner surface of the coil support, said second deflection coil system comprising first and second coils disposed on opposite sides of an axis of the deflection unit, each of said coils including a front flange-shaped portion extending away from the axis and being formed by a packet of conductors running transversely of the axis at a wider end of the flared coil support, at least one of said coils having an end conductor comprising one of said conductors which is disposed away from an outer periphery of the respective flange, characterized in that:

a. the deflection unit includes electrical connection means disposed at the outer surface of the coil support; and b. the coil support includes conductor-receiving means for routing said at least one coil end conductor to said electrical connection means without said conductor occupying space between the inner surface of said coil support and the flange-shaped portion of the respective coil.

3. An apparatus as in claim 1 or 2 where the conductor-receiving means comprises an opening in the coil support extending from the inner surface to the outer surface.

4. An apparatus as in claim 1 or 2 where the conductor-receiving means comprises a groove formed in the inner surface of the coil support.

5. An apparatus as in claim 4 where the groove has a depth which is at least equal to the thickness of the coil end conductor routed by the groove.

6. An apparatus as in claim 4 where the groove extends toward the wider end of the coil support.

7. An apparatus as in claim 1 or 2 where the coil support includes fixation means for fixing the at least one coil end conductor in place.

8. An apparatus as in claim 7 where the fixation means comprise hooks which are integral parts of the coil support.

* * * * *